June 10, 1969  R. A. REZNICEK  3,448,579
FAILURE INDICATOR FOR A MASTER CYLINDER
Filed July 3, 1967
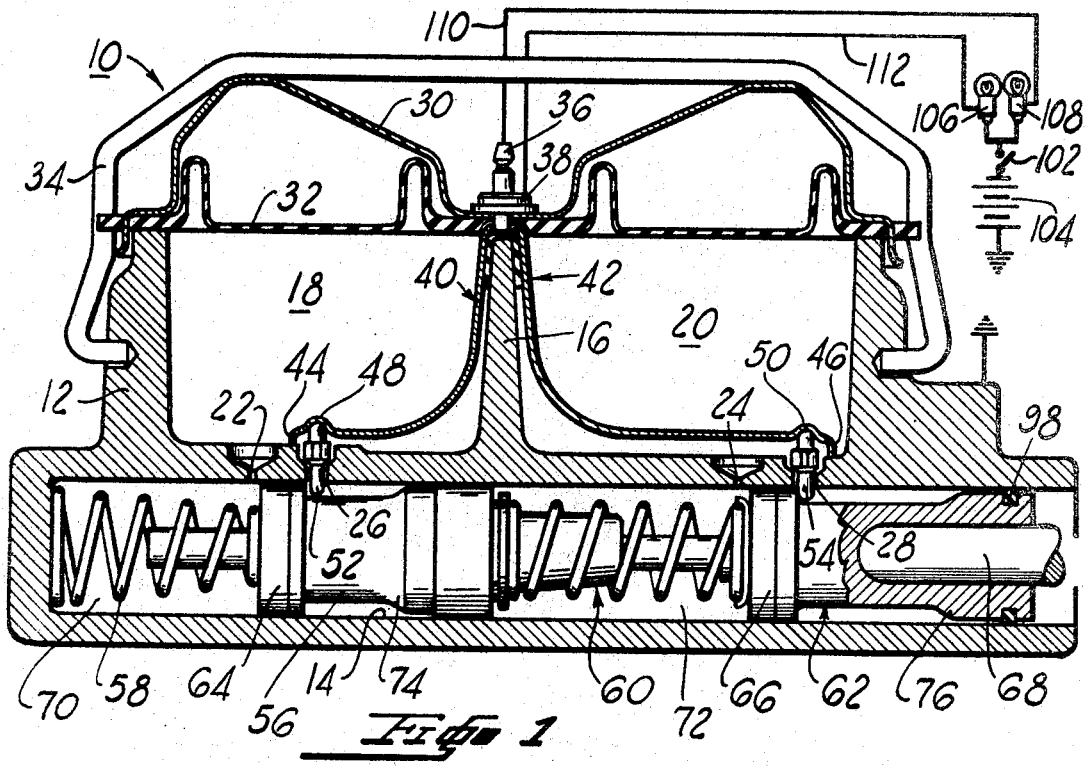
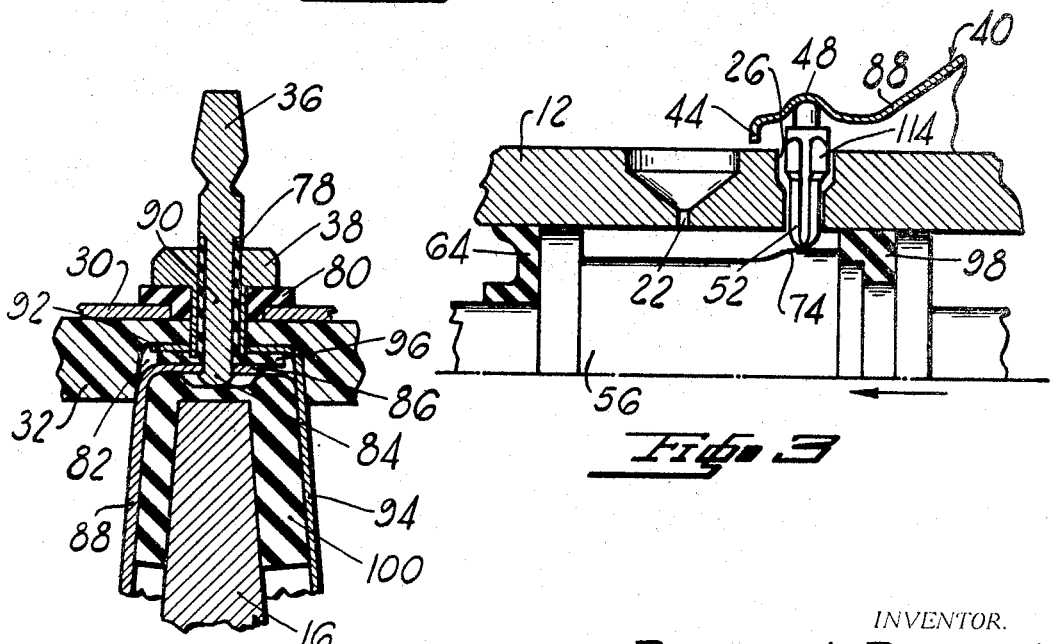
INVENTOR.
RAYMOND A. REZNICEK
BY
Richard G. Geib
ATTORNEY United States Patent Office 3,448,579
Patented June 10, 1969

3,448,579
FAILURE INDICATOR FOR A MASTER CYLINDER
Raymond A. Reznicek, St. Joseph, Mich., assignor to The Bendix Corporation, a corporation of Delaware
Filed July 3, 1967, Ser. No. 650,889
Int. Cl. B15b 7/08, 20/00; B60t 17/22
U.S. Cl. 60—54.6                                                      14 Claims

ABSTRACT OF THE DISCLOSURE

A master cylinder having a warning system actuating device contained completely within the reservoir chamber of the master cylinder and actuatable by a plunger or pin means extending from the reservoir into the bore of the master cylinder to ride along a surface of a piston therein that is contoured so as to operate the actuating device upon an abnormal travel of the piston within the bore.

SUMMARY

Failure indicating devices for brake master cylinders and similar type actuators have long been the object of prior art devices. They have, to a large extent, all been predicated upon the theory of completing an electrical circuit upon a failure condition being sensed in the master cylinder or actuator. This has created electrolytic action within the master cylinder bore that has set up corrosion possibilities which tend to shorten the life of the master cylinder or actuator. Other attempts, more recently, have been to provide closed systems within the bore of the master cylinder, and this has involved expensive manufacturing techniques which can be eliminated by this invention.

More particularly, this invention is concerned with providing a contact within reservoir means of a master cylinder that enables the utilization of a closed circuit under normal conditions that is opened upon abnormal conditions occurring so as to activate a warning system such as, for example, as may be seen in my copending application showing a silicone rectifier device operatively related between a normally closed ground contact in a master cylinder bore and an electrical power source that was filed on June 6, 1967 and bears application Ser. No. 643,922 in the United States Patent Office. In addition, the system utilized with the invention may comprise the extinguishing or diming of a light upon the occurrence of a failure within the master cylinder or actuator in deference to the system disclosed in my copending application.

DRAWING DESCRIPTION

FIGURE 1 is a partial cross section of a master cylinder incorporating an actuating device in accordance with the principles of this invention schematically connected to an electrical warning system;

FIGURE 2 is an enlarged cross sectional detail of the terminal connection of the actuating device in accordance with my invention; and FIGURE 3 is an enlarged cross sectional detail of the actuating device in accordance with the principles of my invention and its operating elements between the reservoir cavity and the bore of the master cylinder or actuator.

DETAILED DESCRIPTION

With regard now to FIGURE 1 there is shown a master cylinder 10 having a housing 12 providing a longitudinal bore 14 and by means of a partition 16 separate reservoir cavities 18 and 20. The reservoir cavities 18 and 20 are communicated, respectively, by means of compensating ports 22 and 24 and filler ports 26 and 28 to the bore 14 of the housing 12. The reservoir cavity is closed by a closure means comprising a cap 30 having a sealing diaphragm 32 clamped between the cap 30 and the housing 12 by means of the spring clip 34.

The cap 30 mounts an electrical terminal having a central portion 36 and another portion 38 insulated one from the other, and will be explained with reference to FIGURE 2, and connected to actuating devices or contact means 40 and 42, respectively. The contact means are made from spring steel and include depending ends 44 and 46 normally engaging the housing 12 with bulbous portions 48 and 50 overlying plastic or similarly non-conductive pin means 52 and 54 projecting through the filler holes 26 and 28 to depend interiorly of the bore 14.

Within the bore 14 a floating piston 56 is assembled between a return spring 58 and a caged spring assembly 60 operatively connected to a manually operable piston 62. As may be appreciated by those skilled in the art to which the invention relates, the pistons 56 and 62 have face seals 64 and 66, respectively, that normally are positioned in the released attitude shown, immediately behind the compensating ports 18 and 20 to the bore 14. Thus, upon motion of the piston as called for by an operator depressing a pedal (not shown) to translate a push rod 68 interiorly of the master cylinder, the face seal 64 and 66 will terminate the communication of the reservoirs 18 and 20 with the chambers 70 and 72 ahead of the pistons 56 and 62, respectively. It should be noted at this juncture that the pistons 56 and 62 are provided with trailing bodies having raised surfaces 74 and 76 adjacent their rearmost end or programmed to be a predetermined distance from the face seals 64 and 66 that will be sufficient for operation of the pins 52 and 54 to indicate an abnormal travel of the pistons.

With regard now to the terminal connection through the cap 30, attention is directed to FIGURE 2 showing the terminal to have central portion 36 insulated by means of a sleeve 78 from the coaxial terminal 38 and from the cap by means of an insulating member 80. As seen, the central portion 36, which extends through the cap 30 into a recessed portion 82 of the diaphragm 32, is provided with a riveted head 84 for connecting the end 86 of the contact 40. End 86 is bent over from the spring arm 88 thereof leading to the end 44, as seen in FIGURE 1. The contact portion 38 has a tubular body 90 projecting about the insulating sleeve 78 through the cap 30 to be connected with an end 92 of the spring arm 94 of the actuating device 42. The sleeve 78 has a head portion 96 between the ends 86 and 92 to insulate them one from the other. This connection of the end 92 to the terminal portions 38 could be done by assembling the insulator 80 to the cap 30 and placing the portion 38 therethrough to turn the lowermost ends thereover around the end 92 of the actuating element 42 with the assemblage of the central terminal portion 36 taking place after portion 38 has been assembled to the end 92.

Attention is now directed to FIGURE 3 showing the end 44 being removed from the housing 12 due to the pin 52 riding up on the raised surface 74 of the piston 56. It should also be noted with reference to FIGURE 3 that the piston 56 is provided with a secondary seal 98, as is the piston 62 as seen in FIGURE 1.

Going back now to FIGURE 2 there is shown an overlay of insulating material 100 to prevent contact of the spring arms 88 and 94 with the partition 16 separating the reservoir cavities 18 and 20.

Thus in operation, and considering a normal operation of the master cylinder shown in FIGURE 1, the operator will depress the brake pedal to move the push rods 68 inwardly whereby the relative stiffness of the spring 58 and the caged spring assembly 60 will permit relative motion of the pistons 56 and 62 to pressurize fluid in the chambers 70 and 72. If one or the other chambers is incapable of developing a pressure, which may be due to a failure in a brake going downstream from the master cylinder 10, the piston 56 or the piston 62, depending upon which chamber has failed, will move to a position whereby the raised surfaces 74 or 76 actuate the pin 52 or 54 as shown in FIGURE 3 with regard to the actuation of the pin 52 to raise the contact end 44 from the housing. With regard to the electrical schematic system shown in FIGURE 1, and assuming the ignition switch 102 is closed between the electrical power source 104 and the lights 106 and 108, this will open the electrical circuit provided by the leads 110 and 112 to the respective lights 106 or 108 so that that light will now go out to indicate there has been a failure of the system. These lights 106 and 108 will be located within the visual range of the operator of the master cylinder 10.

In closing it should be noted that the pins 52 and 54, as with reference to the pin 52 of FIGURE 3, will be provided with grooves 114 to permit fluid flow through the filler ports 26 and 28 regardless of the attitude of the pins 52 or 54 that are guided therein.

Having described an operative construction of a failure device for a master cylinder or similar type actuator, it is now desired to set forth the intended protection sought by the appended claims.

I claim:
1. A master cylinder comprising:
  a housing having a bore and a reservoir cavity;
  piston means in said bore;
  normally closed electrical contact means in said reservoir and operatively connected to said piston means via ports communicating the reservoir to the bore, said contact means functioning to open upon abnormal travel of said piston means.

2. A master cylinder according to claim 1 wherein said contact means includes a spring arm and plunger means biased thereby to ride along a trailing body portion of said piston means which has a rising contour to bring about the opening of the contact means upon the abnormal travel of said piston means.

3. In a master cylinder having a housing with a reservoir cavity and a bore in fluid communication and piston means in the bore to control the fluid communication and develop pressure, a means to indicate abnormal travel of said piston means, which means comprises:
  a spring contact having one end insulated from said housing and connected to a terminal, and another end in contact with said housing; and
  plunger means operatively connecting said contact to said piston means to remove said another end from said housing upon a predetermined travel of the piston means.

4. The structure of claim 3 wherein said reservoir cavity is closed by attaching a cap to said housing, to which cap is connected said spring contact and terminal with an electrical insulating medium therebetween to have said spring contact depending from said cap and said terminal projecting exteriorly.

5. The structure of claim 4 wherein the insulation between said spring contact and said housing is characterized as a U-shaped insulator over a lip of the housing surrounding the reservoir cavity to be under the spring contact and terminal when said cap is assembled to said housing.

6. The structure of claim 3 and further comprising an electrical circuit having indicating means connected to said terminal to be thereby controlled by said another end of said spring contact.

7. The structure of claim 3 wherein said plunger means is characterized as a pin guided by a port between the reservoir cavity and the bore forming at least part of the fluid communication therebetween, said pin having provisions to permit the fluid communication.

8. A hydraulic actuator comprising:
  a housing having communicated reservoir means and bore means;
  piston means in said bore means controlling the communication therewith of said reservoir means, said piston means having a body with a raised surface adjacent its aftermost end;
  a cap means for said reservoir;
  indicating control means positioned by said cap means in said reservoir having an insulated terminal exterior of said actuator and a contact connected to said terminal and normally biased into engagement with said housing; and
  plunger means biased by said control means to engage the body of said piston means so as to raise said contact when said plunger means rides on said raised surface as would occur under an abnormal travel of said piston means in said bore for the development of pressure by said actuator.

9. A hydraulic actuator according to claim 8 wherein the reservoir means and bore means are communicated by a compensating port controlled by a face of said piston means and a fill hole located behind the compensating port to overlie said body.

10. A hydraulic actuator according to claim 9 wherein said plunger means includes a pin having a grooved body guided by said fill hole to engage said control means adjacent said contact and be biased thereby to ride on said body of said piston means.

11. A split master cylinder having a housing containing a pair of reservoirs separated by a partition and a bore underlying said reservoirs with compensating ports and filler ports communicating each reservoir to said bore, and means to provide separate chambers in said bore including operatively related pistons controlling said compensating ports with each of the pistons having body portions underlying said filler ports with raised surfaces on the bodies a predetermined distance behind faces of said pistons characterized by the improvement of electrical control means comprising:
  a first contact in one reservoir insulatingly carried by said partition and having a spring arm maintaining an end thereof in conducting relationship with said housing;
  a second contact in the other reservoir insulatingly carried by said partition and having a spring arm maintaining an end thereof in conducting relationship with said housing; and
  first and second plungers between said first and second contacts and the bodies of said operatively related pistons and maintained thereagainst by the spring arms of said first and second contacts so as to terminate the conductive relationship of the ends thereof with said housing whenever the raised surfaces of said bodies underlie said first and second plungers.

12. The structure of claim 11 wherein said first and second plungers are located in said filler ports and have provisions to permit fluid flow around them through said filler ports.

13. The structure of claim 11 and further comprising first and second terminals insulatingly carried by a closure means for said pair of reservoirs, which first and second terminals are separately connected respectively to said first and second contacts.

14. The structure of claim 13 wherein said closure means includes a sealing diaphragm with said first and second terminals being coaxially connected to said first and second contacts in a recess of said diaphragm overlying said partition which has an insulating overlay that depends into both reservoirs to prevent the spring arm of either said first and second contacts from touching said housing.

References Cited

UNITED STATES PATENTS

| | | | |
|---|---|---|---|
| 2,746,252 | 5/1956 | Reese | 60—54.5 |
| 2,774,958 | 12/1956 | Aldasoro | 188—151.11 XR |
| 2,827,134 | 3/1958 | Raia | 188—151.11 |
| 3,067,842 | 12/1962 | Smith | 188—152.02 |
| 3,228,194 | 1/1966 | Blair. | |
| 3,358,097 | 12/1967 | Kersting | 188—151.11 XR |

MARTIN P. SCHWADRON, *Primary Examiner.*

ROBERT R. BUNEVICH, *Assistant Examiner.*

U.S. Cl. X.R.

188—1, 152, 151